US009632616B2

(12) United States Patent
Kobayashi et al.

(10) Patent No.: US 9,632,616 B2
(45) Date of Patent: Apr. 25, 2017

(54) INTERACTIVE SYSTEM, CONTROL METHOD FOR INTERACTIVE SYSTEM, AND PROJECTOR

(71) Applicant: SEIKO EPSON CORPORATION, Tokyo (JP)

(72) Inventors: Yasuyuki Kobayashi, Matsumoto (JP); Takaaki Koyama, Matsumoto (JP); Nobuyuki Otsuki, Matsumoto (JP); Masahiro Horiguchi, Shiojiri (JP); Yukihiro Karasawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 68 days.

(21) Appl. No.: 14/423,615

(22) PCT Filed: Sep. 13, 2013

(86) PCT No.: PCT/JP2013/005456
§ 371 (c)(1),
(2) Date: Feb. 24, 2015

(87) PCT Pub. No.: WO2014/045560
PCT Pub. Date: Mar. 27, 2014

(65) Prior Publication Data
US 2015/0324054 A1 Nov. 12, 2015

(30) Foreign Application Priority Data
Sep. 18, 2012 (JP) .................................. 2012-204045

(51) Int. Cl.
*G06F 3/033* (2013.01)
*G06F 3/037* (2013.01)
(Continued)

(52) U.S. Cl.
CPC .......... *G06F 3/0416* (2013.01); *G06F 3/0304* (2013.01); *G06F 3/03542* (2013.01); *G06F 3/0425* (2013.01); *H04B 10/1141* (2013.01)

(58) Field of Classification Search
CPC .. G06F 3/0416; G06F 3/0425; G06F 3/03542; G06F 3/033
(Continued)

(56) References Cited

U.S. PATENT DOCUMENTS 5,515,079 A * 5/1996 Hauck ................... G06F 3/0386
345/157
5,926,168 A * 7/1999 Fan ........................ G06F 3/0325
345/158

(Continued)

FOREIGN PATENT DOCUMENTS

CN 102135842 A 7/2011
JP 2009-289243 A 12/2009
(Continued)

OTHER PUBLICATIONS

Dec. 16, 2013 International Search Report issued in International Patent Application No. PCT/JP2013/005456.

*Primary Examiner* — Amare Mengistu
*Assistant Examiner* — Benyam Ketema
(74) *Attorney, Agent, or Firm* — Oliff PLC

(57) ABSTRACT

An interactive system includes a transmitter (light-emitting pen) configured to transmit an optical signal and a projector. The projector includes a signal-intensity setting unit in which intensity information of a synchronization signal is set, a signal-intensity control unit (light-emission control unit) configured to control the intensity of the synchronization signal on the basis of the setting of the signal-intensity setting unit, a synchronization-signal transmitting unit (infrared-light emitting unit) configured to transmit the synchronization signal, and an image pickup unit configured to
(Continued)

pick up an image of the optical signal transmitted from the transmitter. The transmitter includes a receiving unit (pen reception unit) configured to receive the synchronization signal and an optical-signal transmitting unit (pen control unit and a light-emitting diode) configured to transmit the optical signal in synchronization with the synchronization signal received by the receiving unit.

7 Claims, 6 Drawing Sheets

(51) Int. Cl.
*G09G 1/00* (2006.01)
*G09G 3/28* (2013.01)
*G09G 3/22* (2006.01)
*G06F 3/041* (2006.01)
*G06F 3/042* (2006.01)
*H04B 10/114* (2013.01)
*G06F 3/0354* (2013.01)
*G06F 3/03* (2006.01)

(58) Field of Classification Search
USPC .................................................. 345/179–183
See application file for complete search history.

(56) References Cited

U.S. PATENT DOCUMENTS

| | | | | |
|---|---|---|---|---|
| 6,104,512 | A * | 8/2000 | Batey, Jr. | H04B 10/1143 340/7.54 |
| 6,847,356 | B1 * | 1/2005 | Hasegawa | G06F 3/03542 345/157 |
| 8,319,699 | B2 * | 11/2012 | Clodfelter | H04N 9/3147 345/1.1 |
| 2002/0075386 | A1 * | 6/2002 | Tanaka | G06F 3/03542 348/141 |
| 2006/0007134 | A1 * | 1/2006 | Ting | G06F 3/0386 345/156 |
| 2006/0170874 | A1 * | 8/2006 | Yumiki | G03B 17/54 353/42 |
| 2007/0030460 | A1 * | 2/2007 | Mehrl | G03B 17/48 353/79 |
| 2007/0046654 | A1 * | 3/2007 | Tomiya | G06F 3/043 345/179 |
| 2008/0055246 | A1 * | 3/2008 | Okayama | H04N 9/3129 345/158 |
| 2009/0040178 | A1 * | 2/2009 | Machida | G06F 3/0346 345/158 |
| 2010/0321382 | A1 * | 12/2010 | Amaratunga | H04N 5/74 345/419 |
| 2011/0096031 | A1 * | 4/2011 | Nakanishi | G06F 3/0416 345/175 |
| 2013/0100022 | A1 * | 4/2013 | Thompson | G06F 3/033 345/163 |
| 2013/0307830 | A1 | 11/2013 | Bao | |
| 2015/0015482 | A1 * | 1/2015 | Njolstad | G06F 3/0386 345/156 |

FOREIGN PATENT DOCUMENTS

| | | |
|---|---|---|
| JP | 2011-028629 A | 2/2011 |
| JP | 2011-204059 A | 10/2011 |
| WO | 9938279 A1 | 7/1999 |

* cited by examiner

INTERACTIVE SYSTEM, CONTROL METHOD FOR INTERACTIVE SYSTEM, AND PROJECTOR

CROSS REFERENCE TO RELATED APPLICATIONS

The entire disclosure of Japanese Patent Application No. 2012-204045, filed Sep. 18, 2012 is expressly incorporated by reference herein.

TECHNICAL FIELD

The present invention relates to an interactive system, a control method for the interactive system, and a projector.

BACKGROUND ART

There has been proposed an interactive system that projects an image, which is based on an image signal output from a computer, on a whiteboard or the like with a projector, picks up an image of the projected image with an image pickup apparatus, and recognizes operation of a user applied to the projected image with the computer.

For example, there is known a presentation system including a computer, a projection-type video display apparatus (a projector) that projects a video on a projection surface such as a screen, a selective transmission device that transmits light in a specific wavelength band, an image pickup apparatus that picks up an image of the screen or the like, and a pointing stick (a pointer) that is used for pointing a part of the video, and emits infrared light from the distal end thereof (PTL 1). In such a presentation system (an interactive system), it is possible to superimpose a rendered video rendered by the pointing stick (the pointer) on a basic video.

There is also known an information input system (an interactive system) that includes, in an electronic pen (an information input device), a reflecting unit having a predetermined reflecting pattern, specifies the position of the reflecting unit on the basis of a detection result obtained by detecting a wavelength component in reflected light, and specifies an input position of information by the electronic pen on the basis of the position of the reflecting unit.

CITATION LIST

Patent Literature

[PTL 1]
JP-A-2011-28629
[PTL 2]
JP-A-2011-204059

SUMMARY OF INVENTION

Technical Problem

There is an interactive system that transmits an infrared signal for synchronization from a projector to a light-emitting pen (an electronic pen) and synchronizes light emission timing of the light-emitting pen and image pickup timing of an image pickup unit included in the projector. However, when a plurality of the interactive systems are used while being placed side by side, in some case, infrared signals for synchronization emitted from projectors of the respective interactive systems interfere with one another and synchronization with light-emitting pens of the respective interactive systems cannot be correctly performed.

Solution to Problem

An advantage of some aspects of the invention is to solve at least a part of the problems described above, and the invention can be implemented as the following forms or application examples.

Application Example 1

This application example is directed to an interactive system including: a transmitter configured to transmit an optical signal; and a projector. The projector includes: a signal-intensity setting unit in which intensity information of a synchronization signal is set; a signal-intensity control unit configured to control the intensity of the synchronization signal on the basis of the setting of the signal-intensity setting unit; a synchronization-signal transmitting unit configured to transmit the synchronization signal; and an image pickup unit configured to pick up an image of the optical signal transmitted from the transmitter. The transmitter includes: a receiving unit configured to receive the synchronization signal; and an optical-signal transmitting unit configured to transmit the optical signal in synchronization with the synchronization signal received by the receiving unit.

With such an interactive system, intensity information of a synchronization signal to be transmitted is set in the signal-intensity setting unit of the projector. The signal-intensity control unit controls the intensity of the synchronization signal on the basis of the setting of the signal-intensity setting unit. The synchronization-signal transmitting unit transmits the synchronization signal. The transmitter transmits an optical signal in synchronization with the received synchronization signal. Consequently, by changing the intensity of the synchronization signal, it is possible to reduce interference of the synchronization signal with other interactive systems. The respective projectors can be synchronized with transmitters of the projectors.

Application Example 2

This application example is directed to the interactive system according to the application example described above, wherein the projector further includes a synchronization-signal receiving unit configured to receive the synchronization signal. When the synchronization-signal receiving unit receives a second synchronization signal from another projector, the synchronization-signal transmitting unit transmits the synchronization signal in synchronization with the second synchronization signal.

With such an interactive system, when the synchronization-signal receiving unit receives a second synchronization signal from another projector, the synchronization-signal transmitting unit transmits the synchronization signal in synchronization with the second synchronization signal. Consequently, since the transmitter is synchronized with the second synchronization signal transmitted from the other projector, the respective projectors can be synchronized with transmitters of the projectors.

Application Example 3

This application example is directed to the interactive system according to the application example described above, wherein the synchronization-signal transmitting unit includes an infrared-light emitting diode. The synchronization signal transmitted by the synchronization-signal transmitting unit is an infrared signal.

With such an interactive system, the synchronization signal is an infrared signal. Consequently, the projector and the transmitter can be synchronized with each other.

Application Example 4

This application example is directed to the interactive system according to the application example described above, wherein the synchronization-signal transmitting unit includes a plurality of the infrared-light emitting diodes. The signal-intensity control unit changes the number of emitted lights of the plurality of infrared-light emitting diodes to control the intensity of the synchronization signal.

With such an interactive system, the signal-intensity control unit can change the intensity of the synchronization signal by changing the number of emitted lights of the plurality of infrared-light emitting diodes.

Application Example 5

This application example is directed to the interactive system according to the application example described above, wherein the projector further includes: an operation receiving unit configured to receive predetermined operation; and a control unit configured to set, when the operation receiving unit receives the predetermined operation, intensity information of the synchronization signal based on the predetermined operation in the signal-intensity setting unit.

With such an interactive system, when the operation receiving unit receives predetermined operation, the control unit sets intensity information of the synchronization signal based on the predetermined operation in the signal-intensity setting unit. Consequently, a user can change the intensity of the synchronization signal.

Application Example 6

This application example is directed to a control method for an interactive system including a transmitter configured to transmit an optical signal and a projector including a signal-intensity setting unit in which intensity information of a synchronization signal is set. The method includes: a signal-intensity control step of the projector controlling the intensity of the synchronization signal on the basis of the setting of the signal-intensity setting unit; a synchronization-signal transmitting step of the projector transmitting the synchronization signal; an image pickup step of the projector picking up an image of the optical signal transmitted from the transmitter; a receiving step of the transmitter receiving the synchronization signal; and an optical-signal transmitting step of the transmitter transmitting the optical signal in synchronization with the synchronization signal received by the receiving step.

With such a control method for the interactive system, by changing the intensity of the synchronization signal, it is possible to reduce interference of the synchronization signal with other interactive systems. Respective projectors can be synchronized with transmitters of the projectors.

Application Example 7

This application example is directed to a projector including: a signal-intensity setting unit in which intensity information of a synchronization signal is set; a signal-intensity control unit configured to control the intensity of the synchronization signal on the basis of the setting of the signal-intensity setting unit; and a synchronization-signal transmitting unit configured to transmit the synchronization signal.

With such a projector, intensity information of a synchronization signal to be transmitted is set in the signal-intensity setting unit. The signal-intensity control unit controls the intensity of the synchronization signal on the basis of the setting of the signal-intensity setting unit. The synchronization-signal transmitting unit transmits the synchronization signal. Consequently, by changing the intensity of the synchronization signal, it is possible to reduce interference of the synchronization signal with other interactive systems.

When the interactive system, the control method for the interactive system, and the projector are constructed using a computer included in the projector, the forms and the application examples can also be configured in a form of, for example, a program for realizing the functions of the forms and the application examples or a recording medium having the program recorded therein to be readable by the computer. As the recording medium, it is possible to use various media readable by the computer such as a flexible disk, an HDD (Hard Disk Drive), a CD-ROM (Compact Disk Read Only Memory), a DVD (Digital Versatile Disk), a Blu-ray Disc (registered trademark), a magneto-optical disk, a non-volatile memory card, internal storage devices (semiconductor memories such as a RAM (Random Access Memory) and a ROM (Read Only Memory)) of the projector, and an external storage device (a USB (Universal Serial Bus) memory, etc.).

DESCRIPTION OF EMBODIMENT

Embodiment

As an embodiment, an interactive system that picks up an image of a projected image and detects operation in the projected image on the basis of the pickup image is explained.

Figure 1:
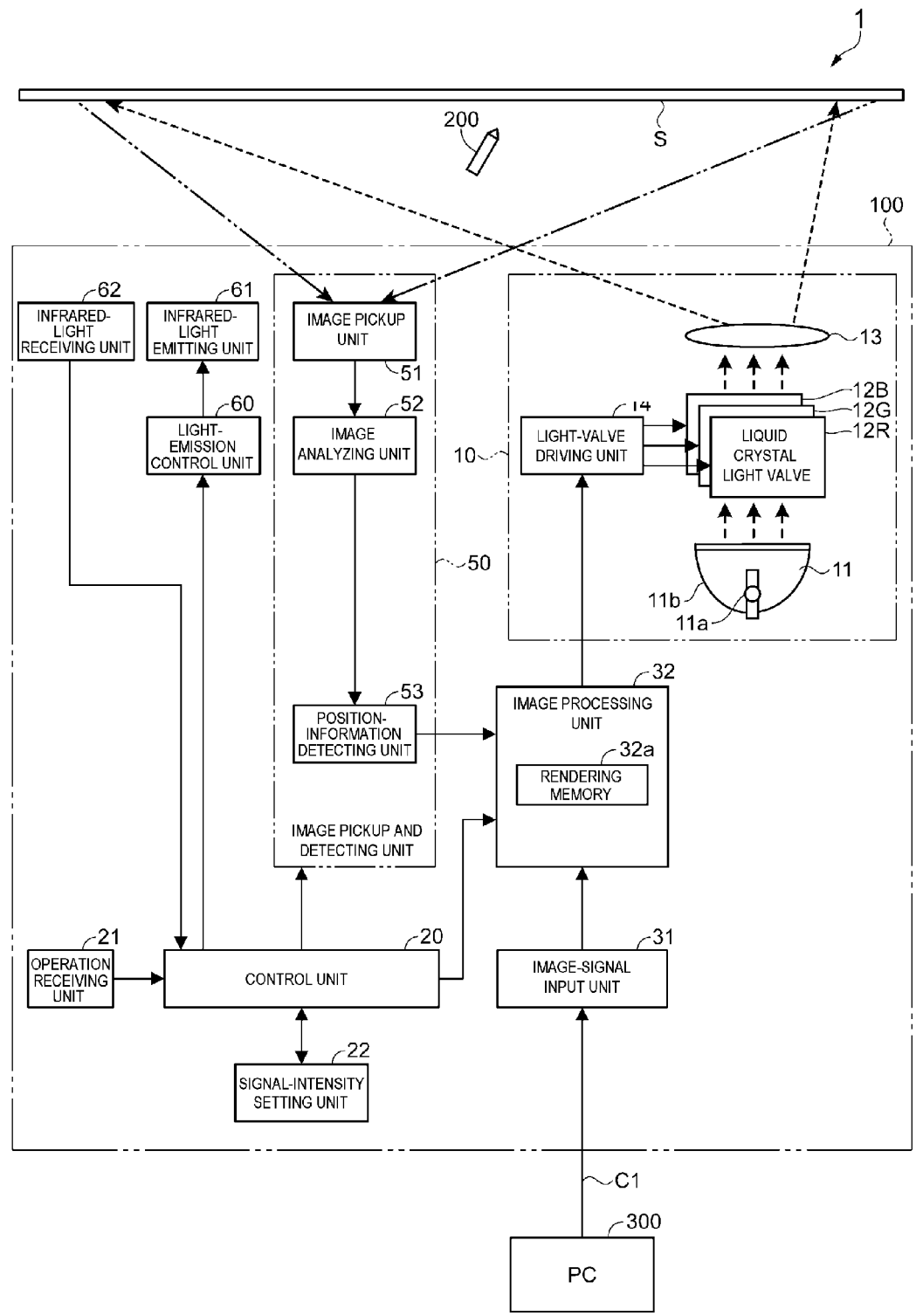
FIG. 1 is a block diagram showing the configuration of an interactive system according to an embodiment.

FIG. 1 is a block diagram showing the configuration of an interactive system according to this embodiment.

In FIG. 1, as an interactive system 1, a light-emitting pen 200 functioning as a transmitter, a projector 100, a personal computer (PC) 300, and a projection surface S such as a whiteboard are shown.

The projector 100 includes an image projecting unit 10, a control unit 20, an operation receiving unit 21, a signal-intensity setting unit 22, an image-signal input unit 31, an image processing unit 32, an image pickup and detecting unit 50, a light-emission control unit 60 functioning as a signal-intensity control unit, an infrared-light emitting unit 61 functioning as a synchronization-signal transmitting unit, and an infrared-light receiving unit 62 functioning as a synchronization-signal receiving unit.

The image projecting unit 10 includes a light source 11, three liquid crystal light valves 12R, 12G, and 12B functioning as light modulating devices, a projection lens 13 functioning as a projection optical system, and a light-valve driving unit 14. The image projecting unit 10 modulates light emitted from the light source 11 in the liquid crystal light valves 12R, 12G, and 12B to form image light and projects the image light from the projection lens 13 to display the image light on the projection surface S or the like.

The light source 11 includes a light source lamp 11a of a discharge type configured by an extra-high pressure mercury lamp, a metal halide lamp, or the like and a reflector 11b configured to reflect light radiated by the light source lamp 11a to the liquid crystal light valves 12R, 12G, and 12B side. The light emitted from the light source 11 is converted into lights having substantially uniform luminance distributions by a not-shown integrator optical system and, after being separated into color light components of red R, green G, and blue B, which are the three primary colors of light, by a not-shown color separation optical system, respectively made incident on the liquid crystal light valves 12R, 12G, and 12B.

The liquid crystal light valves 12R, 12G, and 12B are configured by, for example, a liquid crystal panel in which liquid crystal is encapsulated between a pair of transparent substrates. In the liquid crystal light valves 12R, 12G, and 12B, a plurality of pixels (not shown in the figure) arrayed in a matrix shape are formed. A driving voltage can be applied to the liquid crystal for each of the pixels. When the light-valve driving unit 14 applies driving voltages corresponding to input image information to the pixels, the pixels are set to light transmittance corresponding to the image information. Therefore, the light emitting from the light source 11 is modulated by being transmitted through the liquid crystal light valves 12R, 12G, and 12B. An image corresponding to the image information is formed for each of the color lights. Formed images of the colors are combined for each of the pixels by a not-shown color combination optical system into a color image and then the color image is projected from the projection lens 13.

The control unit 20 includes a CPU (Central Processing Unit), a RAM used for, for example, temporary storage of various data, and a nonvolatile memory such as a mask ROM, a flash memory, or an FeRAM (Ferroelectric RAM) (all of which are not shown in the figure). The control unit 20 functions as a computer. The CPU operates according to a control program stored in the nonvolatile memory, whereby the control unit 20 collectively controls the operation of the projector 100. The control unit 20 includes a timer and measures, for example, timing for transmission of a synchronization signal and image pickup of an image pickup unit 51.

The operation receiving unit 21 receives input operation from a user. The operation receiving unit 21 includes a plurality of operation keys for the user to give various instructions to the projector 100. As the operation keys included in the operation receiving unit 21, there are a power key for switching ON and OFF of a power supply, a menu key for switching display and non-display of a menu image for performing various kinds of setting, a cursor key used for, for example, movement of a cursor on the menu image, a determination key for determining the various kinds of setting, and the like. When the user operates (depresses) the operation keys of the operation receiving unit 21, the operation receiving unit 21 receives the input operation and outputs an operation signal corresponding to operation contents of the user to the control unit 20.

As the operation receiving unit 21, a remote controller (not shown in the figure), which can be remotely operated, may be used. In this case, the remote controller transmits an operation signal of an infrared ray or the like corresponding to operation contents of the user. A remote-controller-signal receiving unit receives the operation signal and communicates the operation signal to the control unit 20. In this embodiment, the infrared-light receiving unit 62 also functions as the remote-controller-signal receiving unit.

The signal-intensity setting unit 22 is configured by a nonvolatile memory. Intensity information of light emission intensity of an infrared signal (a synchronization signal) transmitted from the infrared-light emitting unit 61 controlled by the light-emission control unit 60 is set and stored in the signal-intensity setting unit 22. In this embodiment, in the signal-intensity setting unit 22, a "normal mode" for light emission at normal light emission intensity or a "weak mode" for light emission at light emission intensity lower than the normal light emission intensity can be set as a setting value of the intensity information of the light emission intensity.

In the image-signal input unit 31, an input terminal (not shown in the figure) for connection to the PC 300 via a cable C1 is provided. An image signal is input to the image-signal input unit 31 from the PC 300. The image-signal input unit 31 converts the input image signal into image information of a form processable by the image processing unit 32 and outputs the image information to the image processing unit 32.

The image processing unit 32 converts the image information input from the image-signal input unit 31 into image data representing gradations of the pixels of the liquid crystal light valves 12R, 12G, and 12B and outputs the image data to the light-valve driving unit 14. The converted image data is image data by color lights of R, G, and B. The converted image data is configured by a plurality of pixel values corresponding to all the pixels of the liquid crystal light valves 12R, 12G, and 12B. The pixel values specify light transmittances of the pixels corresponding thereto. Intensities (gradations) of lights emitted from the pixels are specified by the pixel values. The image processing unit 32 applies, on the basis of an instruction of the control unit 20, for example, image quality adjustment processing for adjusting brightness, contrast, sharpness, hue, and the like to the converted image data. Further, the image processing unit 32 generates image data of a menu image or the like on the basis of an instruction of the control unit 20.

The image processing unit 32 includes a rendering memory 32a. The rendering memory 32a stores rendering data based on rendering operation by the light-emitting pen 200.

The image processing unit 32 receives position information of the light-emitting pen 200 from the image pickup and detecting unit 50. The position information is information representing a position pointed by the light-emitting pen 200 in an image (a display image) displayed by the image projecting unit 10. The image processing unit 32 stores rendering data in the rendering memory 32a on the basis of a position where rendering operation of the light-emitting pen 200 is performed. The image processing unit 32 combines the rendering data of the rendering memory 32a with the image data input from the image-signal input unit 31 and outputs combined image data to the light-valve driving unit 14.

When the light-valve driving unit 14 drives the liquid crystal light valves 12R, 12G, and 12B according to the image data input from the image processing unit 32, the liquid crystal light valves 12R, 12G, and 12B form an image corresponding to the image data. The image is projected from the projection lens 13.

The image pickup and detecting unit 50 includes an image pickup unit 51, an image analyzing unit 52, and a position-information detecting unit 53. The image pickup and detecting unit 50 is controlled by the control unit 20. The image pickup and detecting unit 50 picks up an image of the projection surface S, analyzes the image, and detects the position of the light-emitting pen 200.

The image pickup unit 51 includes an image pickup device or the like (not shown in the figure) configured by a CCD (Charge Coupled Device) sensor, a CMOS (Complementary Metal Oxide Semiconductor) sensor, or the like and an image pickup lens (not shown in the figure) for focusing light emitted from an image pickup target on the image pickup device. The image pickup unit 51 is arranged in the vicinity of the projection lens 13 of the projector 100. The image pickup unit 51 picks up an image of a range including an image projected on the projection surface S (hereinafter referred to as "projected image" as well) on the basis of an instruction of the control unit 20. The image pickup unit 51 sequentially generates image information representing the picked-up image (hereinafter referred to as "pickup image" as well) and outputs the image information to the image analyzing unit 52.

The image analyzing unit 52 includes a processing device, a memory, and the like for image analysis (all of which are not shown in the figure). The image analyzing unit 52 performs an analysis of the image information of the pickup image input from the image pickup unit 51. The image analyzing unit 52 outputs an analysis result to the position-information detecting unit 53. The image analyzing unit 52 converts position information on the pickup image into position information on an image based on the image signal.

The position-information detecting unit 53 detects position information of the light-emitting pen 200 on the basis of the analysis result of the image analyzing unit 52. The position-information detecting unit 53 outputs the position information of the light-emitting pen 200 to the image processing unit 32.

Software (a device driver) for using the light-emitting pen 200 as a rendering device (a transmitter) is stored in the nonvolatile memory of the control unit 20. In a state in which the software is started, the image processing unit 32 recognizes, on the basis of the position information input from the image pickup and detecting unit 50, each of positions where rendering operation of the light-emitting pen 200 is performed in a projected image. The image processing unit 32 causes the rendering memory 32a to store rendering data and outputs image data based on the rendering data to the light-valve driving unit 14.

The light-emission control unit 60 controls light emission of the infrared-light emitting unit 61 on the basis of an instruction of the control unit 20. Specifically, the light-emission control unit 60 can light an infrared-light emitting diode included in the infrared-light emitting unit 61 by supplying electric power to the infrared-light emitting diode and extinguish the infrared-light emitting diode by stopping the supply of the electric power.

The light-emission control unit 60 can control light emission intensity of an infrared signal emitted by the infrared-light emitting unit 61. In this embodiment, the infrared-light emitting unit 61 includes a plurality of the infrared-light emitting diodes. The light-emission control unit 60 switches the number of the infrared-light emitting diodes, which are caused to emit lights, to control the light emission intensity. Specifically, the light-emission control unit 60 can switch the infrared-light emitting diodes to a normal mode for lighting and extinguishing all the infrared-light emitting diodes and a weak mode for lighting and extinguishing a part of the infrared-light emitting diodes.

The infrared-light emitting unit 61 is configured by an infrared-light emitting device (not shown in the figure) or the like including an infrared-light emitting diode. The infrared-light emitting unit 61 causes the infrared-light emitting diode to emit light on the basis of control information input from the light-emission control unit 60 and transmits an infrared signal to the outside. Specifically, the infrared-light emitting unit 61 transmits a synchronization signal of infrared light.

The infrared-light receiving unit 62 includes an infrared receiving module. The infrared-light receiving unit 62 receives an infrared signal emitted from another projector or the like and notifies the control unit 20 of the infrared signal. In this embodiment, the infrared-light receiving unit 62 is used as a remote-controller-signal receiving unit as well.

Next, the light-emitting pen 200 is explained. The light-emitting pen 200 includes, at a distal end portion (a pen tip) of a pen-like main body, a press switch, a pen reception unit functioning as a receiving unit configured to receive a synchronization signal, and a light-emitting diode configured to emit infrared light as an optical signal.

Figure 2:
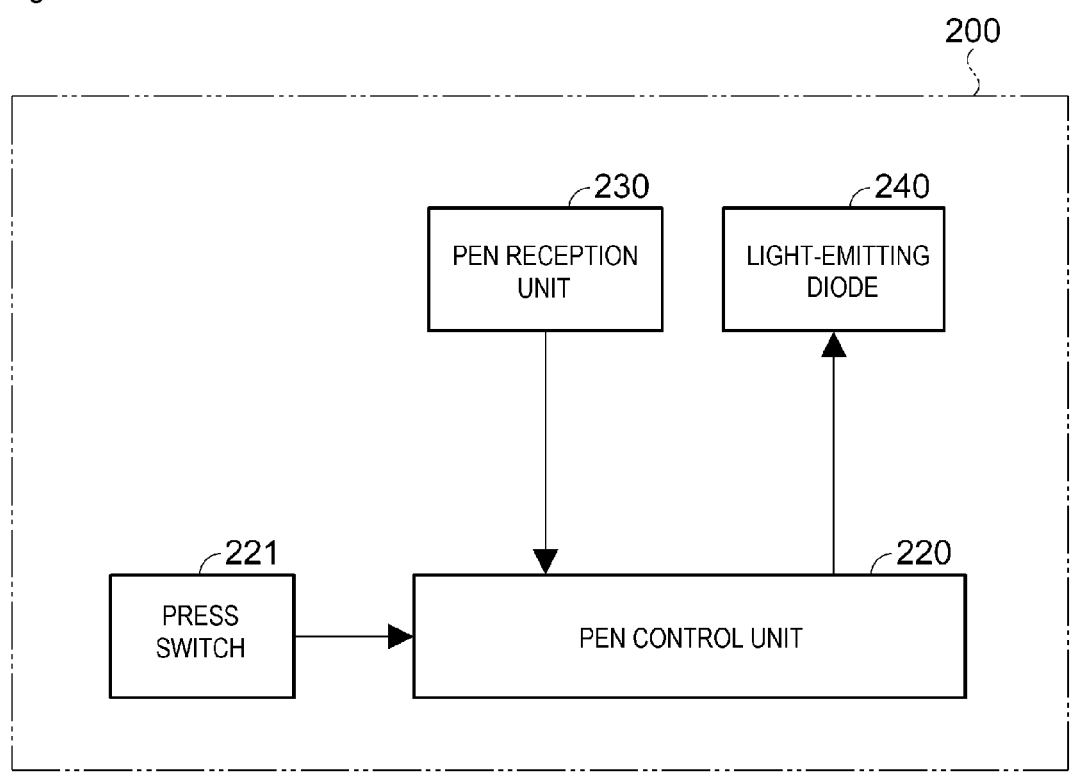
FIG. 2 is a block diagram showing the configuration of a light-emitting pen according to the embodiment.

FIG. 2 is a block diagram showing the configuration of the light-emitting pen 200 according to this embodiment.

The light-emitting pen 200 includes a pen control unit 220, a press switch 221, a pen reception unit 230 configured to receive an infrared signal, which is a synchronization signal, and a light-emitting diode 240 configured to emit infrared light. When the user performs operation (pressing operation) for pressing the pen tip of the light-emitting pen 200 against the projection surface S and presses the press switch 221, the pen control unit 220 causes the light-emitting diode 240 to emit light to be synchronized with the synchronization signal received by the pen reception unit 230. The pen control unit 220 and the light-emitting diode 240 are equivalent to the optical-signal transmitting unit.

Timing of the synchronization signal emitted from the infrared-light emitting unit 61 of the projector 100, timing when the light-emitting pen 200 emits light, and timing when the projector 100 picks up an image of emitted light of the light-emitting pen 200 are explained.

Figure 3:
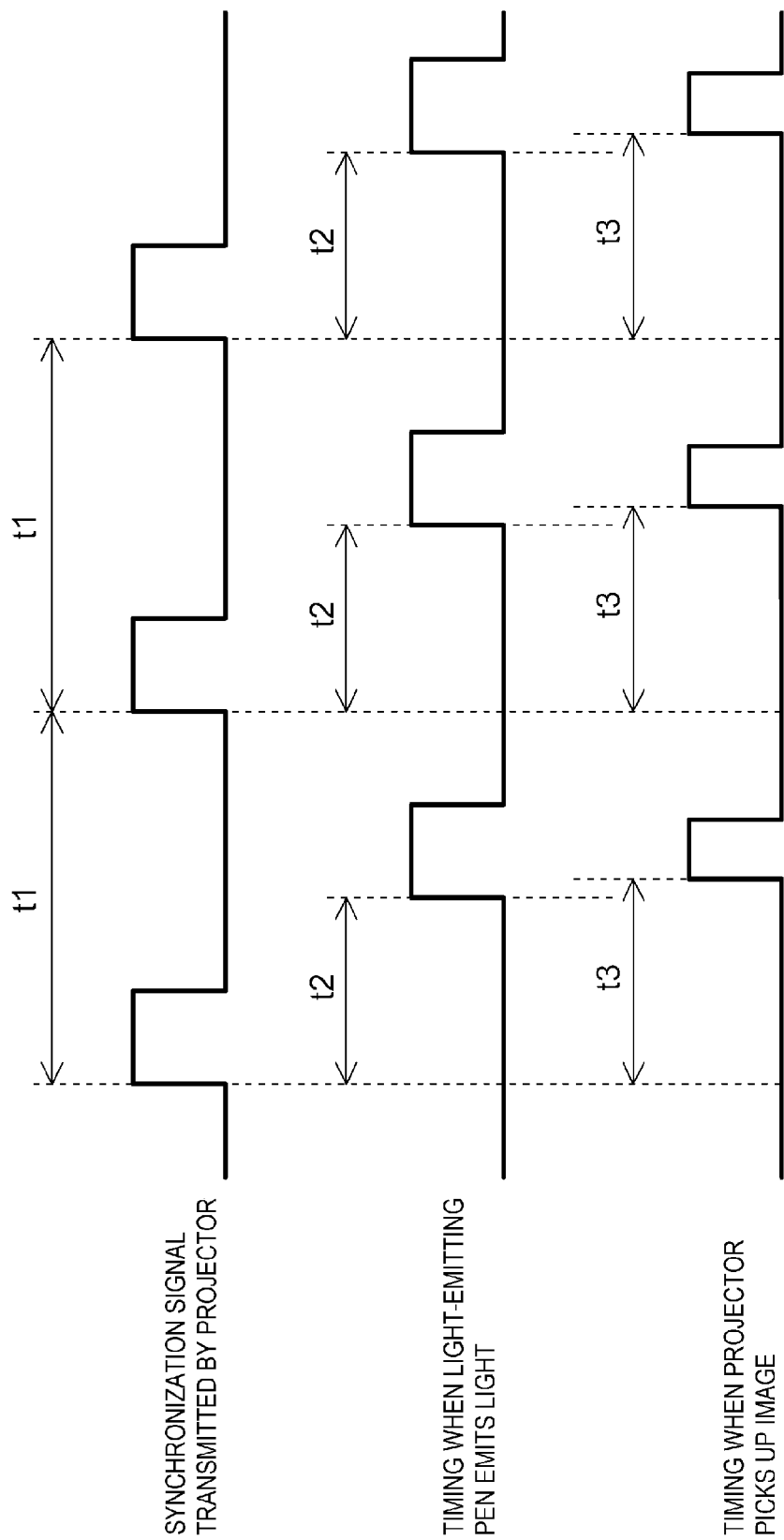
FIG. 3 is a timing chart representing synchronization timing in the interactive system.

FIG. 3 is a timing chart representing synchronization timing in the interactive system 1.

As shown in FIG. 3, the synchronization signal transmitted by the infrared-light emitting unit 61 of the projector 100 is output at a time interval t1. The control unit 20 including the timer instructs the light-emission control unit 60 to cause the infrared-light emitting unit 61 to transmit the synchronization signal. In the light-emitting pen 200, the reception unit receives the synchronization signal. After time t2 from the reception of the synchronization signal, the light-emitting pen 200 causes the light-emitting diode to emit light. The image pickup unit 51 of the projector 100 picks up the light emission of the light-emitting pen 200 after time t3 from the transmission of the synchronization signal by the infrared-light emitting unit 61 according to an instruction from the control unit 20. The time t3 is larger than the time t2.

At such timings, the infrared-light emitting unit 61 of the projector 100 transmits the synchronization signal, the light-emitting pen 200 emits light, and the image pickup unit 51 of the projector 100 picks up an image. Therefore, the projector 100 can correctly pick up an image of the emitted light of the light-emitting pen 200.

Figure 4:
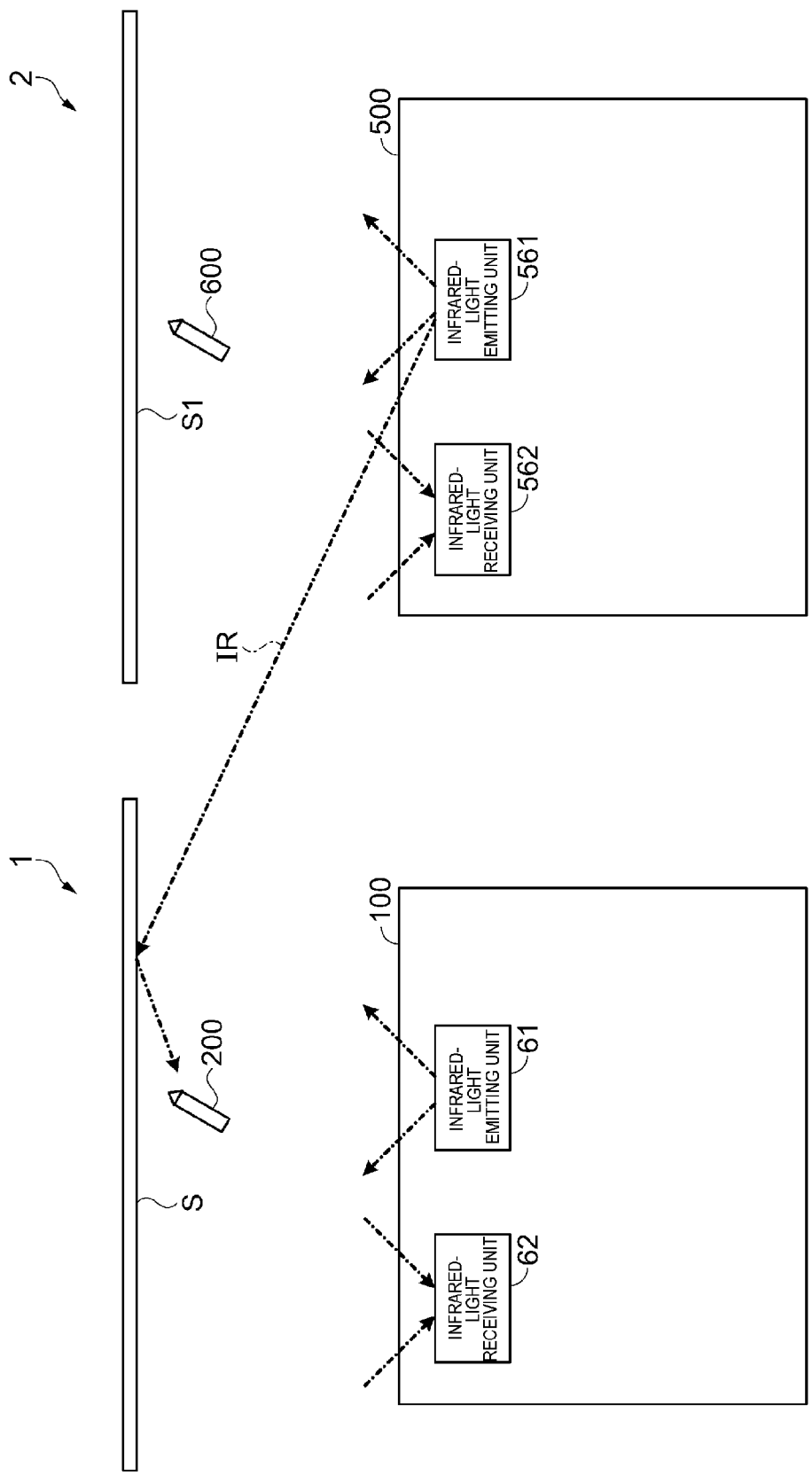
FIG. 4 is an explanatory diagram of interactive systems provided side by side.

A form in which a plurality of the interactive systems are set is explained. FIG. 4 is an explanatory diagram of the interactive systems provided side by side.

As shown in FIG. 4, the interactive system 1 includes the light-emitting pen 200 and the projector 100. The interactive system 1 is set to be opposed to the projection surface S. The projector 100 includes the infrared-light emitting unit 61 and the infrared-light receiving unit 62. An interactive system 2 includes a light-emitting pen 600 and a projector 500. The interactive system 2 is set to be opposed to a projection surface S1. The projector 500 includes an infrared-light emitting unit 561 and an infrared-light receiving unit 562. The interactive system 1 and the interactive system 2 are provided side by side.

When the interactive systems are provided side by side in this way, in some case, an infrared signal emitted from the projector of one interactive system is received by the light-emitting pen of the other interactive system. FIG. 4 shows a form in which an infrared signal IR emitted by the infrared-light emitting unit 561 of the projector 500 is received by the light-emitting pen 200 of the interactive system 1. Since the light-emitting pen 200 is used near the projection surface S, the light-emitting pen 200 often receives the infrared signal IR reflected by the projection surface S.

When the light-emitting pen 200 receives an infrared signal (a second synchronization signal) emitted from the projector 500, light emission timing of the light-emitting pen 200 shifts. The image pickup unit 51 of the projector 100 cannot normally pickup an image of emitted light of the light-emitting pen 200. Therefore, an interactive function does not normally operate. In this embodiment, the operation of the interactive function is stabilized by changing the light emission intensity of an infrared signal transmitted from the infrared-light emitting unit 61 or tuning light emission timing of the infrared signal with the synchronization signal (the second synchronization signal) emitted from the other projector 500. Details are explained below.

Setting of light emission intensity of the infrared-light emitting unit 61 is explained. In the projector 100 in this embodiment, the user can perform setting of the light emission intensity of an infrared signal (a synchronization signal) according to a menu image. When determining that another projector is present around the projector 100, the projector 100 switches the light emission intensity on the basis of a setting value of the light emission intensity.

Figure 5:
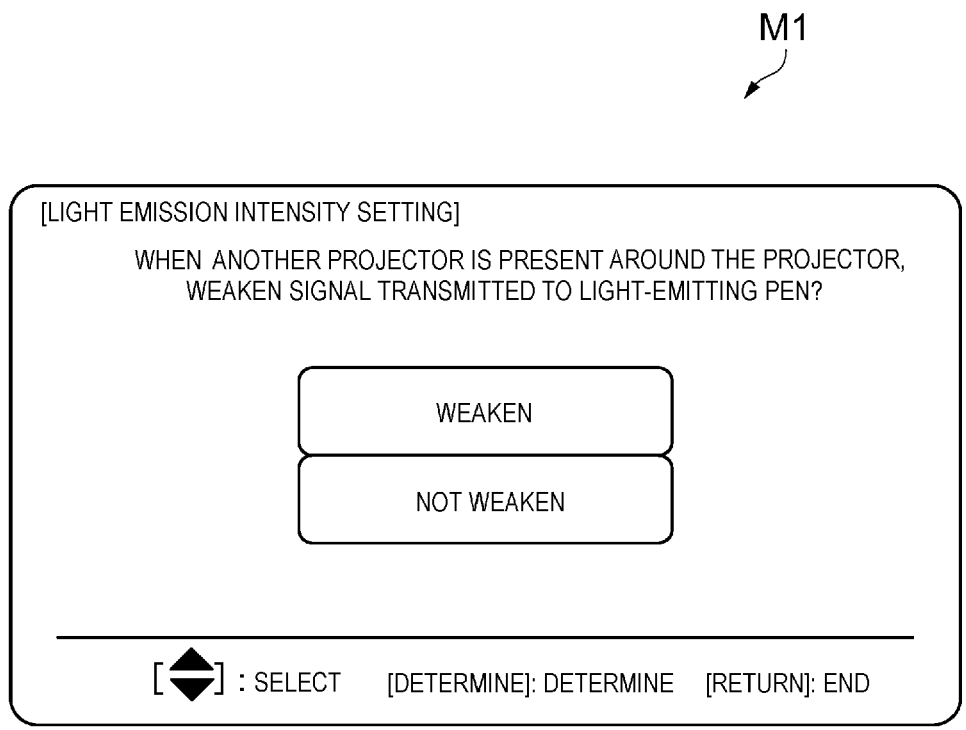
FIG. 5 is an explanatory diagram of a menu image for setting light emission intensity.

FIG. 5 is an explanatory diagram of the menu image for setting the light emission intensity.

When the menu key included in the operation receiving unit 21 is depressed and a light emission intensity setting menu is selected, the control unit 20 instructs the image processing unit 32 to display a light emission intensity setting menu image M1 shown in FIG. 5.

A character string "light emission intensity setting" is displayed in an upper part of the light emission intensity setting menu image M1. Under the character string, a character string "When another projector is present around the projector, weaken a signal transmitted to the light-emitting pen?" is displayed. "Weaken" and "Not weaken" are displayed as setting candidates in the center of the light emission intensity setting menu image M1. "Weaken" means that the light emission intensity is set in the weak mode. "Not weaken" indicates that the light emission intensity is set in the normal mode. The user selects and determines desired setting out of the setting candidates displayed on the light emission intensity setting menu image M1, whereby the control unit 20 stores information concerning a setting value of the setting (the mode) in the signal-intensity setting unit 22. Operation at this point is equivalent to the predetermined operation.

Figure 6:
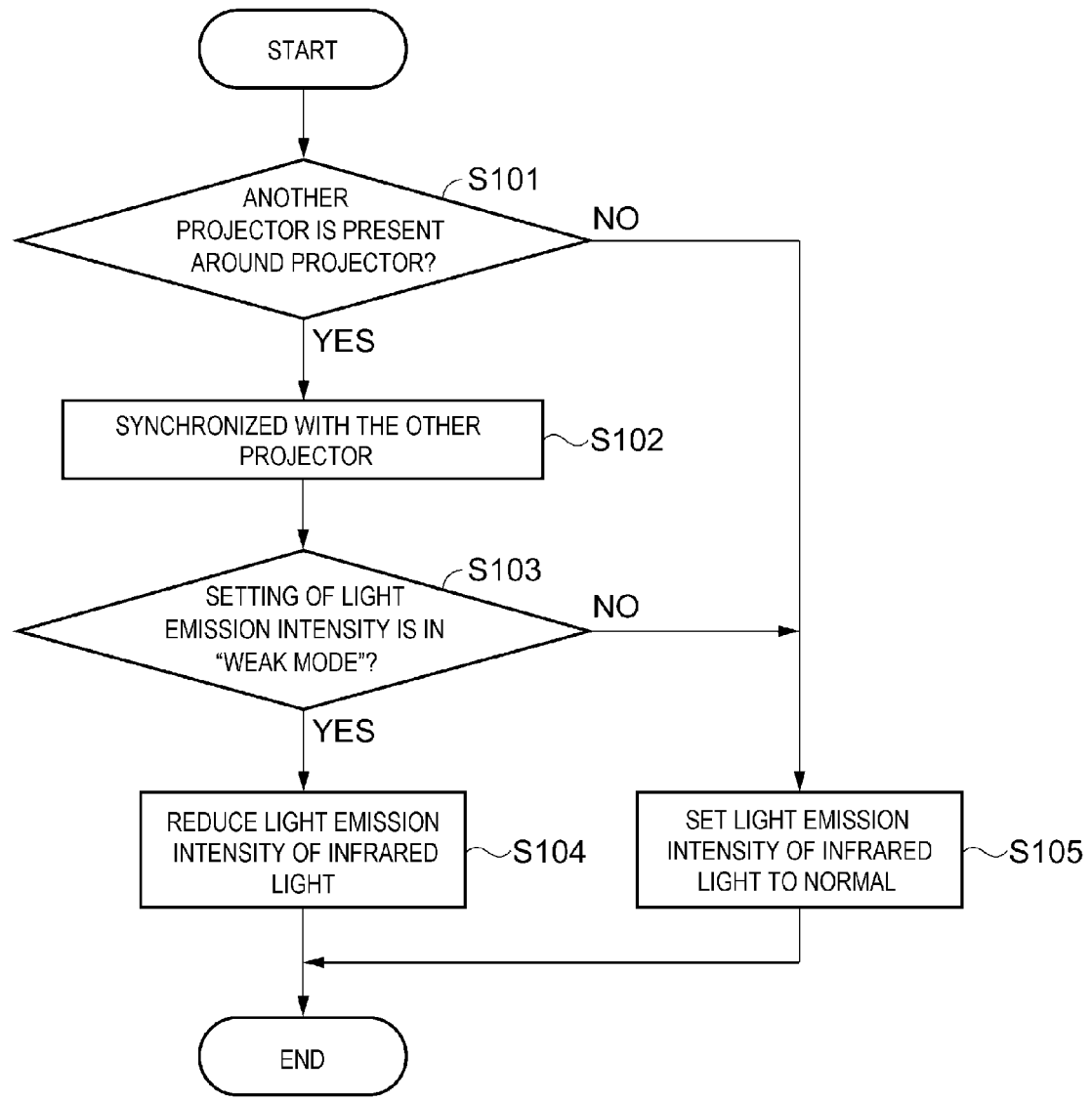
FIG. 6 is a flowchart of infrared light emission intensity switching processing of a projector.

Next, switching processing for the light emission intensity of an infrared signal (hereinafter referred to as "infrared light emission intensity switching processing") executed during the start of the projector 100 is explained. Note that the infrared light emission intensity switching processing is executed at periodic timing after the start as well. FIG. 6 is a flowchart of the infrared light emission intensity switching processing for the projector 100.

When the projector 100 is started, the control unit 20 determines whether another projector is present around the projector 100 (step S101). Specifically, the control unit 20 instructs the light-emission control unit 60 to stop transmission of an infrared signal including a synchronization signal. The control unit 20 determines whether the infrared-light receiving unit 62 is receiving an infrared signal. If the infrared-light receiving unit 62 is receiving an infrared signal, the control unit 20 determines that the infrared signal is an infrared signal transmitted from another projector and determines that another projector is present around the projector 100.

When another projector is present around the projector 100 (step S101: YES), the control unit 20 synchronizes the projector 100 with the other projector (step S102). Specifically, the control unit 20 instructs the light-emission control unit 60 to be synchronized with a synchronization signal (a second synchronization signal) of the infrared light received by the infrared-light receiving unit 62 and causes the infrared-light emitting unit 61 to transmit the synchronization signal of the infrared light. That is, the control unit 20 tunes light emission timing of the infrared light with the synchronization signal (the second synchronization signal) of the other projector.

The control unit 20 determines whether the setting of the light emission intensity is in the "weak mode" (step S103). Specifically, the control unit 20 determines whether the setting of the light emission intensity is in the "weak mode" referring to the setting value of the light emission intensity stored in the signal-intensity setting unit 22.

When the setting of the light emission intensity is in the "weak mode" (step S103: YES), the control unit 20 instructs the light-emission control unit 60 to reduce the light emission intensity of the infrared light (the synchronization signal) emitted by the infrared-light emitting unit 61 (step S104). The control unit 20 ends the infrared light emission intensity switching processing.

When the setting of the light emission intensity is not in the "weak mode" (step S103: NO), that is, the setting of the light emission intensity is in the "normal mode", the control unit 20 instructs the light-emission control unit 60 to set the light emission intensity of the infrared light (the synchronization signal) emitted by the infrared-light emitting unit 61 to normal (step S105). The control unit 20 ends the infrared light emission intensity switching processing.

When another projector is absent around the projector 100 (step S101: NO), the control unit 20 shifts to step S105 and sets the light emission intensity of the infrared light to normal. The control unit 20 ends the infrared light emission intensity switching processing.

According to the embodiment explained above, effects explained below are obtained.

(1) The light-emission control unit 60 of the projector 100 of the interactive system 1 controls light emission intensity of an infrared signal, which is a synchronization signal, transmitted by the infrared-light emitting unit 61. Consequently, when the intensity of the synchronization signal is reduced, it is possible to reduce interference of the synchronization signal with the other interactive system 2. In the respective interactive systems, the projectors can be synchronized with the light-emitting pens of the projectors. This is useful because influence due to an environment of use is reduced and the respective projectors can stably perform the interactive function using the light-emitting pens of the projectors.

(2) The projector 100 of the interactive system 1 can display the light emission intensity setting menu image M1 for setting the light emission intensity of an infrared signal, which is a synchronization signal. The user can select and set the light emission intensity of the infrared signal. When the other projector 500 is present around the projector 100, the infrared-light emitting unit 61 of the projector 100 emits an infrared signal according to the setting of the light emission intensity. Consequently, convenience is improved because the user can set the light emission intensity of the infrared signal.

(3) When the other projector 500 is present around the projector 100 of the interactive system 1, that is, when the infrared-light receiving unit 62 receives a synchronization signal (a second synchronization signal) transmitted from the other projector 500, the projector 100 transmits a synchronization signal synchronized with the received synchronization signal (second synchronization signal) from the infrared-light transmitting unit 61. That is, the projector 100 and the projector 500 synchronize (tune) timings of the synchronization signals to be transmitted. Consequently, the light-emitting pen 200 and the light-emitting pen 600 can be synchronized with the projector 100 and the projector 500. Therefore, the respective projectors can pick up images of emitted lights of the light-emitting pens of the projectors. This is useful because the respective projectors can stably perform the interactive function by the light-emitting pens.

(4) The projector 100 of the interactive system 1 executes the infrared light emission intensity switching processing at periodic timings at the start and after the start of the projector 100. Consequently, it is possible to determine at the start and periodically whether the other projector 500 is present. This is useful because it is possible to immediately change the light emission intensity of infrared light (an infrared signal) when the presence of another projector is detected.

(5) The synchronization signal emitted by the projector 100 of the interactive system 1 is an infrared signal. Consequently, it is possible to simplify the configurations of the projector 100 and the light-emitting pen 200.

(6) The light-emission control unit 60 of the projector 100 of the interactive system 1 changes the number of emitted lights of the plurality of infrared-light emitting diodes included in the infrared-light emitting unit 61 to change the light emission intensity of the infrared signal. Consequently, it is possible to switch the light emission intensity of the infrared signal to the normal mode and the weak mode.

Note that the invention is not limited to the embodiment explained above and can be carried out while being applied with various modifications, alterations, and the like.

Modification 1

In the embodiment, when the other projector 500 is present around the projector 100, the infrared-light emitting unit 61 of the projector 100 emits the infrared signal according to the setting value of the light emission intensity set by the user. However, the infrared-light emitting unit 61 may emit the infrared signal according to the setting value of the light emission intensity set by the user irrespective of the presence of the projector 500 around the projector 100.

Modification 2

In the embodiment, when the other projector 500 is present around the projector 100, the infrared-light emitting unit 61 of the projector 100 emits the infrared signal according to the light emission intensity set by the user. However, the light emission intensity is not limited to the light emission intensity set by the user. For example, the light emission intensity may be switched according to the light reception intensity of an infrared signal of the other projector 500 received by the infrared-light receiving unit 62. Specifically, when the light reception intensity is equal to or higher than predetermined intensity, the light-emission control unit 60 may determine that the other projector 500 is present near the projector 100 and reduce the light emission intensity of the light emission of the infrared-light emitting unit 61 (the weak mode). When the light reception intensity is lower than the predetermined intensity, the light-emission control unit 60 may determine that the other projector 500 is preset far from the projector 100 and increase the light emission intensity (the normal mode).

Modification 3

In the embodiment, in the infrared light emission intensity switching processing, after the projector 100 is synchronized with the other projector 500, the control unit 20 reads out the setting value of the light emission intensity from the signal-intensity setting unit 22 and causes the light-emission control unit 60 to switch the light emission intensity of the infrared signal according to the setting value. However, the infrared light emission intensity switching processing is not limited to this. When being synchronized with the projector 500, the projector 100 may display a menu image same as the light emission intensity setting menu image M1 on a projected image. The projector 100 may cause the user to select and set light emission intensity on the menu image. The control unit 20 may cause the light-emission control unit 60 to switch the light emission intensity of the infrared signal according to the set light emission intensity.

Modification 4

In the embodiment, the light emission intensity of the infrared signal controlled by the light-emission control unit 60 and emitted by the infrared-light emitting unit 61 can be switched to the "normal mode" and the "weak mode". However, the switching of the light emission intensity is not limited to the two stages. For example, the light emission intensity may be switchable in three or more stages.

Modification 5

In the embodiment, the setting of the light emission intensity of the infrared signal is performed by displaying the light emission intensity setting menu image M1. However, the setting of the light emission intensity of the infrared signal is not limited to this. For example, a key for switching the light emission intensity may be provided in the operation receiving unit 21. The user may depress the key to change the setting value of the light emission intensity and cause the signal-intensity setting unit 22 to set and store the setting value.

Modification 6

In the embodiment, the synchronization signal is the infrared signal (the infrared light). However, the synchronization signal is not limited to this. For example, the synchronization signal may be visible light or may be a radio wave for radio communication or the like.

Modification 7

In the embodiment, the transmitter is the light-emitting pen 200 that emits the infrared light. However, the transmitter is not limited to such a light-emitting pen. For example, the transmitter may be a transmitter that emits visible light or may use a radio wave for radio communication or the like.

Modification 8

In the embodiment, an apparatus that supplies the image signal to the projector 100 is the PC 300. However, the apparatus is not limited to a personal computer and may be other image supply apparatuses.

Modification 9

In the embodiment, the projector 100 and the PC 300 are connected by the cable C1. However, input and output of information may be performed by radio communication.

Modification 10

In the embodiment, the light source 11 includes the light source lamp 11a of the discharge type. However, solid-state light sources such as an LED (Light Emitting Diode) light source and a laser and other light sources can also be used.

Modification 11

In the embodiment, in the projector 100, the liquid crystal light valves 12R, 12G, and 12B of a transmission type are used as the light modulating devices. However, light modulating devices of a reflection type such as liquid crystal light valves of the reflection type can also be used. Further, for example, a micro-mirror array device that controls an emitting direction of incident light for each of micro-mirrors functioning as pixels to thereby modulate light emitted from a light source can also be used.

REFERENCE SIGNS LIST 1, 2 Interactive systems
10 Image projecting unit
11 Light source
11a Light source lamp
11b Reflector
12R, 12G, 12B Liquid crystal light valves
13 Projection lens
14 Light-valve driving unit
20 Control unit
21 Operation receiving unit
22 Signal-intensity setting unit
31 Image-signal input unit
32 Image processing unit
32a Rendering memory
50 Image pickup and detecting unit
51 Image pickup unit
52 Image analyzing unit
53 Position-information detecting unit
60 Light-emission control unit
61 Infrared-light emitting unit
62 Infrared-light receiving unit
100, 500 Projectors
200, 600 Light-emitting pens
220 Pen control unit
221 Press switch
230 Pen reception unit
240 Light-emitting diode
300 PC
561 Infrared-light emitting unit
562 Infrared-light receiving unit
S, S1 Projection surfaces
C1 Cable

The invention claimed is:

1. An interactive system comprising:
a transmitter configured to transmit an optical signal; and a projector,
the projector including:
a memory in which intensity information of a synchronization signal is set, the synchronization signal being for synchronization between the projector and the transmitter;
one or more processors configured to control intensity of the synchronization signal on the basis of the setting of the memory, the one or more processors being programmed to determine whether another projector is present near the projector, and to change the intensity of the synchronization signal in response to a determination that the other projector is present near the projector, in accordance with the setting of the memory;
a first light source configured to transmit the synchronization signal; and
a sensor configured to pick up an image of the optical signal transmitted from the transmitter, and
the transmitter including:
a first signal receiver configured to receive the synchronization signal; and
a second light source configured to transmit the optical signal in synchronization with the synchronization signal received by the first signal receiver.

2. The interactive system according to claim 1, wherein the projector further includes a second signal receiver configured to receive the synchronization signal, and
when the second signal receiver receives a second synchronization signal from another projector, the first light source transmits the synchronization signal in synchronization with the second synchronization signal.

3. The interactive system according to claim 1, wherein the first light source includes an infrared-light emitting diode, and
the synchronization signal transmitted by the first light source is an infrared signal.

4. The interactive system according to claim 3, wherein the first light source includes a plurality of the infrared-light emitting diodes, and
the one or more processors change the number of emitted lights of the plurality of infrared-light emitting diodes to control the intensity of the synchronization signal.

5. The interactive system according to claim 1, wherein the projector further includes:
an input device configured to receive predetermined operation, and
the one or more processors are configured to set, when the input device receives the predetermined operation, intensity information of the synchronization signal based on the predetermined operation in the memory.

6. A control method for an interactive system including a transmitter configured to transmit an optical signal and a projector including a memory in which intensity information of a synchronization signal is set, the synchronization signal being for synchronization between the projector and the transmitter,
the method comprising:
a signal-intensity control step of the projector controlling intensity of the synchronization signal on the basis of the setting of the memory, the signal-intensity control step including determining whether another projector is present near the projector and changing the intensity of the synchronization signal in response to a determination that the other projector is present near the projector, in accordance with the setting of the memory;

a synchronization-signal transmitting step of the projector transmitting the synchronization signal;

an image pickup step of the projector picking up an image of the optical signal transmitted from the transmitter;

a receiving step of the transmitter receiving the synchronization signal; and an optical-signal transmitting step of the transmitter transmitting the optical signal in synchronization with the synchronization signal received by the receiving step.

7. A projector comprising:

a memory in which intensity information of a synchronization signal is set, the synchronization signal being for synchronization between the projector and a transmitter;

one or more processors configured to control the intensity of the synchronization signal on the basis of the setting of the memory, the one or more processors being programmed to determine whether another projector is present near the projector, and to change the intensity of the synchronization signal in response to a determination that the other projector is present near the projector, in accordance with the setting of the memory; and a first light source configured to transmit the synchronization signal.

* * * * *